Sept. 28, 1965 C. H. DOERSAM, JR 3,209,332

REFLEXING BUFFER

Filed Sept. 7, 1961

INVENTOR
CHARLES H. DOERSAM JR.
BY
Douglas M. Clarkson
ATTORNEY

United States Patent Office 3,209,332
Patented Sept. 28, 1965

3,209,332

REFLEXING BUFFER

Charles H. Doersam, Jr., Port Washington, N.Y., assignor to Potter Instrument Company, Inc., Plainview, N.Y., a corporation of New York Filed Sept. 7, 1961, Ser. No. 136,579
11 Claims. (Cl. 340—172.5)

This invention, generally, relates to devices for storing digital information temporarily between a substantially continuous information input and an intermittent information utilization device, and more particularly, the invention relates to a new and improved "reflex buffer."

In the art, the term "reflex buffer" identifies a device or circuit which absorbs a flow of information in a transmitting medium that is interrupted intermittently. A high speed printer is an example of a utilization device that operates in accordance with information fed in continuously from a computer.

However, information flow to high speed printers must be interrupted during the actual printing cycle to permit the stored information to be read out. During this interval, the continuous flow of input information must be absorbed, or "buffed," to prevent the loss of several digital information bits and even entire characters.

In the past, duplicate input storage devices have been used, and the information being fed in continuously was shifted, or "reflexed," from one input to the other while printing was stopped for the paper feed interval. This, of course, required duplication of component parts which, to the economy-minded manufacturer, presented an extravagant solution to the problem.

Accordingly, it is an object of this invention to provide an information buffer having a minimum of component parts, reducing the manufacturing cost to a new low.

Also, it is an object of the invention to provide a new and improved information buffer.

Still another object of the invention is to provide an information buffer requiring smaller information storage parts interconnected in a unique manner to store information temporarily during a relatively brief interruption of a utilization device.

Briefly, the invention in one of its aspects includes first, second and third information storage devices, such as stepping registers to store digital information in a predetermined pattern. A preferred pattern for storing the information is sequentially bit-by-bit. The first and second information storage devices are connected in parallel, and a circuit is provided to feed information alternately, such as to one storage device during the print cycle of a high speed printer and to the other storage device during the paper feed cycle of the printer.

Another circuit is provided to connect the first and second storage devices alternately to the third storage device from which the information is read out to the printer. By this arrangement, it is necessary to duplicate only a portion of the buffer register capacity.

Figure 1:
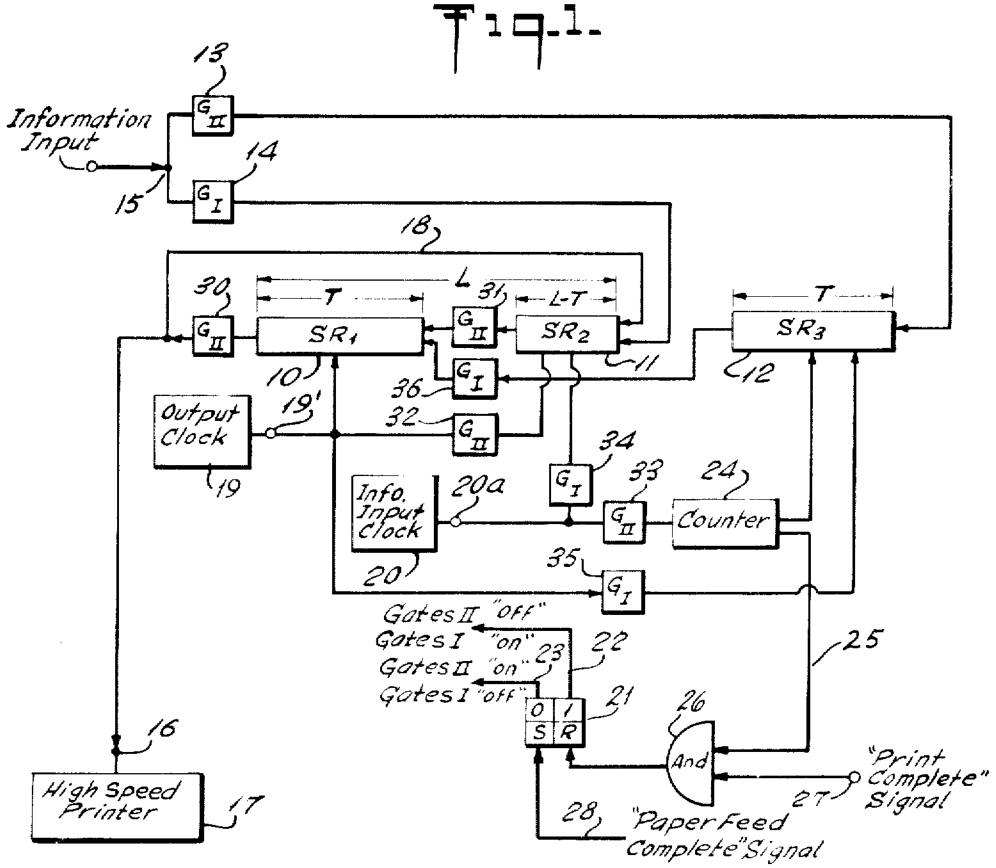
Figure 2:
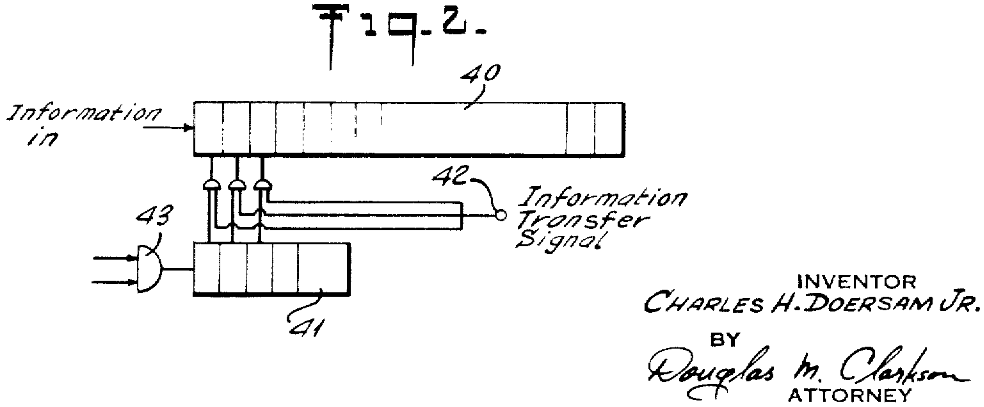

The above and other objects and advantages of the invention will become apparent from a reading of the following description taken in conjunction with the accompanying drawings, in which:

FIGURE 1 is a circuit diagram showing component parts interconnected in accordance with the principles of the invention; and FIGURE 2 is a circuit diagram illustrating diagrammatically a modification in accordance with the invention.

Referring now to FIGURE 1, which forms a preferred embodiment of the invention, the numerals 10, 11 and 12 identify information storage devices which will be referred to hereinafter by designations $SR_1$, $SR_2$ and $SR_3$. While any form of storage device may be used, a stepping register will be described for the purpose of illustration.

Information is read into each register $SR_1$, $SR_2$ and $SR_3$ at one end and is stepped sequentially step-by-step therethrough until the information is read out bit-by-bit.

It will be noted in FIGURE 1 that the registers $SR_2$ and $SR_3$ are connected in parallel, both having circuit connections to read into register $SR_1$. However, gating circuits 13 and 14, designated also $G_{II}$ and $G_I$, respectively provide selective control to direct input information signals between registers $SR_2$ and $SR_3$. The timing sequence will be described in greater detail presently.

For the purposes of the present description, it is assumed that the information input at terminal 15 is substantially continuous, and it is assumed further that the information output at terminal 16 is used to operate a high speed printer 17. Such printers have cycles during which printing is performed and alternate cycles during which paper is advanced. Therefore, the flow of information at the output terminal 16 is intermittent, and the purpose of the buffer circuit shown between the input terminal 15 and the output terminal 16 is to store the information during this intermittent interval.

Assume that the printing cycle requires a maximum time T. The information storage capacity, as determined by the number of stages for example, of the registers $SR_1$ and $SR_3$ have been selected to store information from the input terminal 15 during this interval of time T.

An interval of time designated L indicates the maximum time contemplated between successive printing cycles for the high speed printer 17, so that the total information storage capacity of the two registers $SR_1$ and $SR_2$ taken together provide sufficient storage capacity for the maximum printing plus paper feed time interval which may be expected. The information storage capacity of the register $SR_2$ is designated L–T and represents sufficient information storage capacity during the paper feed interval.

During the printing cycle, information usually is circulated at a rapid rate through the registers $SR_1$ and $SR_2$ by means of a connection designated by the numeral 18. If the stepping rate of the registers $SR_1$ and $SR_2$ during the printing interval is faster than the rate at which the information was stored, this rate is determined by separate output clock pulses (information request rate) connected at terminal 19'.

During this printing interval, information is fed into register $SR_3$ which is stepped at a rate determined by the input rate of information fed into terminal 15. This is determined by an information input clock 20 connected to terminal 20*a*.

The printing time, by way of example, is in the order of 30 milliseconds, and therefore, the time interval T may indicate approximately 30 milliseconds. A nominal paper feed time which may be expected is in the order of 15 milliseconds, and therefore, the time interval L–T may indicate 15 milliseconds. Accordingly, it may be expected in this instance that the information storage capacity of register $SR_2$ is approximately one-half that of either register $SR_1$ or register $SR_3$, but of course, the exact storage capacity will depend upon the requirements for a particular installation and may be equal for all three registers when the paper feed time and the printing time are equal.

Control of all the gating circuits $G_I$ and $G_{II}$ is provided by flip-flop circuit 21 having output connections 22 and 23. The connections 22 and 23 have legends in FIGURE 1 to identify directly the function which they perform.

A counter 24 counts the clock pulses applied to register $SR_3$ and provides an output signal over connection 25 to an AND gate 26 when a predetermined number of clock pulses is received, such as a number representing the time interval T. When a signal indicating completion of the printing cycle is applied at terminal 27 coincidentally with the signal from counter 24, an output from the AND gate 26 switches the circuit 21 provide an output over connection 22. Alternatively, when a signal representing the completion of the paper feed time is applied to terminal 28, the circuit 21 is switched to provide an output signal over connection 23.

In operation, assume that the printer 17 is in its printing cycle and all of the gates $G_{II}$ are open, all gates $G_I$ being closed, the print information is circulated rapidly around the loop which includes $SR_1$, gate 30, conductor 18, $SR_2$ and gate 31, while appropriate presentation of the information for printing is being delivered to terminal 16. During this interval while the printer is printing, gate 14 is closed and the input information is passed through gate 13 for delivery to register $SR_3$.

Since it is assumed that the rate of circulation of the printer information around the loop described above is faster than the rate at which it is being delivered at the input terminal 15, a source 19 of output clock pulses is applied at terminal 19' to step the register $SR_1$ and the register $SR_2$ at this fast rate, gate 32 being open now. However, information input clock pulses applied at terminal 20*a* pass through gate 33 and counter 24 to step the register $SR_3$ coincidentally with the input information. Note that the gate 34 is closed blocking input clock pulses to register $SR_2$ during the printing cycle.

When the counter 24 reaches a predetermined count of clock pulses providing a signal to condition the AND gate 26 and a signal is received at terminal 27 indicating completion of the printing cycle, the AND gate 26 switches the circuit 21 to turn "off" all gates $G_{II}$ and turn "on" all gates $G_I$. Now, gate 35 is open or "on" connecting output clock pulses from terminal 19' to step the register $SR_3$ coincidentally with register $SR_1$, and since the gate 36 is open, information temporarily stored in register $SR_3$ is transferred quickly to the register $SR_1$.

The gate 14 permits the input information to be directed to register $SR_2$ for temporary storage until completion of the paper feed cycle at which time the circuit 21 switches to repeat the cycle described above.

While the transfer of information described above is from stage to stage or in series, the transfer may be accomplished by a parallel transfer with an arrangement as indicated in FIGURE 2 of the drawings. In FIGURE 2, a register 40 is assumed to have storage capacity represented by the time interval T, and a register 41 is assumed to have a smaller capacity.

At an appropriate point in the timing cycle, a shift pulse is applied at terminal 42 to condition each of the AND gates identified by the letter A. Now, when the output of AND gate 43 steps the register 41 step-by-step, the information stored in each stage is transferred laterally to the corresponding stage of the register 40 without the necessity of transferring the information in series completely through the register 41. This arrangement provides an increase in the speed of operation and may be preferred under appropriate circumstances. The remainder of the circuit in FIGURE 2 is similar to that described above in connection with FIGURE 1.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

I claim:

1. An information buffer for a continuous information input system comprising first stepping register means adapted to store information in a predetermined pattern, first means connected to said first stepping register means to receive information input signals, second stepping register means adapted to store information in a predetermined pattern, second means connected to said second stepping register means to receive information input signals, gate means responsive to an external signal to direct information input signals alternately to said first and second stepping register means, third stepping register means adapted to store information in a pattern similar to said first-mentioned pattern, means to connect output information signals from said first and second stepping register means alternately to the input of said third stepping register means, connection means from the output of said third stepping register means to the input of said first stepping register means to define an information signal recirculation path for transferring said information in said third stepping register means to said first stepping register means, and output connection means for said third stepping register means for connecting an information utilization device.

2. An information buffer as set forth in claim 1 wherein said external signal includes a source of clock pulses.

3. An information buffer as set forth in claim 1 wherein counter means is connected to said second stepping register means to produce a signal when said second stepping register means exhibits a predetermined information storage characteristic.

4. An information buffer as set forth in claim 1 wherein said gate means includes a gating circuit connected in series with the respective inputs of said first and second stepping register means to switch information input signals between said inputs.

5. An information buffer as set forth in claim 1 wherein said first, second and third stepping register means include substantially equal information storage capacities.

6. An information buffer as set forth in claim 3 wherein said counter means includes circuit means to initiate read-out of said second stepping register means when both a predetermined count is attained and a predetermined signal is received from said utilization device.

7. An information buffer for a continuous information input system comprising first stepping register means adapted to step information sequentially through respective stages, first means connected to said first stepping register means to receive information input signals, second register means adapted to step information sequentially through respective stages, second means connected to said second stepping register means to receive information input signals, gate means responsive to an external signal to direct information input signals alternately to said first and second stepping register means, a source of clock pulses to provide at least a portion of said external signal, counter means connected to said second stepping register means to produce a signal when said second stepping register means exhibits a predetermined information storage characteristic, third stepping register means adapted to step information sequentially through respective stages, means to connect output information signals from said first and second stepping register means alternately to the input of said third stepping register means, connection means from the output of said third stepping register means to the input of said first stepping register means to define an information signal recirculation path for transferring said information in said third stepping register means to said first stepping register means, and output connection means for said third stepping register means for connecting an information utilization device.

8. An information buffer as set forth in claim 7 wherein said gate means includes a gating circuit connected in series with the respective inputs of said first and second stepping register means to switch information input signals between said inputs.

9. An information buffer as set forth in claim 7 wherein said first, second and third stepping register means include substantially equal information storage capacities, and said gate means includes separate gating circuits connected with respective ones of said first and second stepping register means.

10. An information buffer as set forth in claim 7 wherein said counter means includes circuit means to initiate read-out of said second stepping register means when both a predetermined count is attained and a predetermined signal is received from said utilization device.

11. An information buffer for a continuous information input system comprising first electrical storage means to store digital information signals in sequential stages, first means to connect a source of information input signals to said first electrical storage means, second electrical storage means to storage digital information signals in sequential stages, second means to connect a source of information input signals to said second electrical storage means, gate means responsive to a predetermined signal to direct information input signals selectively to said first and said second electrical storage means, third electrical storage means to storage digital information signals in sequential stages, first circuit means to transfer the same information represented by the information signals stored in said second electrical storage means to said third electrical storage means, second circuit means to transfer the same information represented by the information signals stored in said first electrical storage means to said third electrical storage means, timing means to coordinate said first circuit means, connection means from the output of said third stepping register means to the input of said first stepping register means to define an information signal recirculation path for transferring said information in said third stepping register means to said first stepping register means, and said second circuit means to transfer information selectively from said first and second electrical storage means to said third electrical storage means, and output connection means for said third electrical storage means to transmit information to an information utilization device.

References Cited by the Examiner

UNITED STATES PATENTS

| | | | |
|---|---|---|---|
| 2,905,930 | 9/59 | Golden | 340—172.5 |
| 2,985,864 | 5/61 | Fillebrown | 340—172.5 |

ROBERT C. BAILEY, *Primary Examiner.*

IRVING L. SRAGOW, *Examiner.*